United States Patent [19]
Joichi

[11] Patent Number: 5,838,649
[45] Date of Patent: Nov. 17, 1998

[54] APPARATUS FOR DEMODULATING DIGITAL FM SIGNAL IN AN OPTICAL DISC DEVICE

[75] Inventor: Yoshiro Joichi, Tokyo, Japan

[73] Assignee: Sony Corporation, Tokyo, Japan

[21] Appl. No.: 955,909

[22] Filed: Oct. 23, 1997

Related U.S. Application Data

[62] Division of Ser. No. 665,884, Jun. 19, 1996.

[30] Foreign Application Priority Data

Jun. 20, 1995 [JP] Japan .................................. 7-176748

[51] Int. Cl.⁶ ................................ H09H 5/76; G11B 7/24
[52] U.S. Cl. .......................................... 369/60; 369/275.4
[58] Field of Search .......................... 369/60, 59, 93–95, 369/32, 108, 109, 111, 275.1, 275.4, 44.13, 44.29, 47, 275.3; 329/313

[56] References Cited

U.S. PATENT DOCUMENTS

| | | | |
|---|---|---|---|
| 4,540,947 | 9/1985 | Fujimoto | 329/313 |
| 4,942,565 | 7/1990 | Lagadec | 369/59 |
| 5,210,738 | 5/1993 | Iwata et al. | 369/275.1 |
| 5,537,373 | 7/1996 | Horikiri | 369/44.13 |

*Primary Examiner*—Ali Neyzari
*Attorney, Agent, or Firm*—Frommer Lawrence & Haug, LLP; William S. Frommer; Dennis M. Smid

[57] ABSTRACT

A frequency modulated signal, which is expected to have level inversions at data bit boundaries, and which is produced by the reflection of a laser beam from a wobbled spiral groove on a disk-shaped recording medium is detected. The frequency modulated signal is demodulated and its signal level at the location just after the absence of a level inversion is corrected. The position of a movable recording/reproducing head is determined in response to the demodulated FM signal; and data is recorded on or reproduced from the recording medium at the determined position.

18 Claims, 14 Drawing Sheets

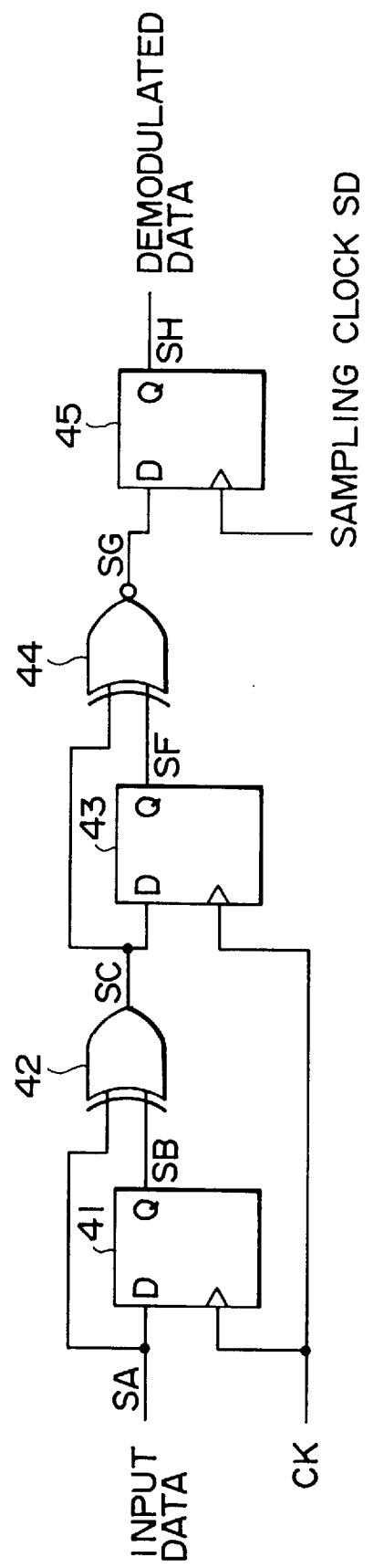
F I G. 5

F I G. 7A    | 0 | 1 | 1 | 0 | 0 |
F I G. 7B    
F I G. 7C    
F I G. 7D    
F I G. 7E    
F I G. 7F    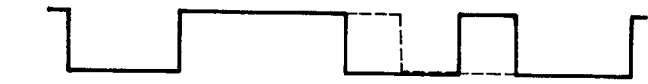
F I G. 7G    
F I G. 7H    
F I G. 7I    | 0 | 1 | 1 | 0 | 0 |

FIG. 9A
(PRIOR ART)
FIG. 9B
(PRIOR ART)
FIG. 10
(PRIOR ART)
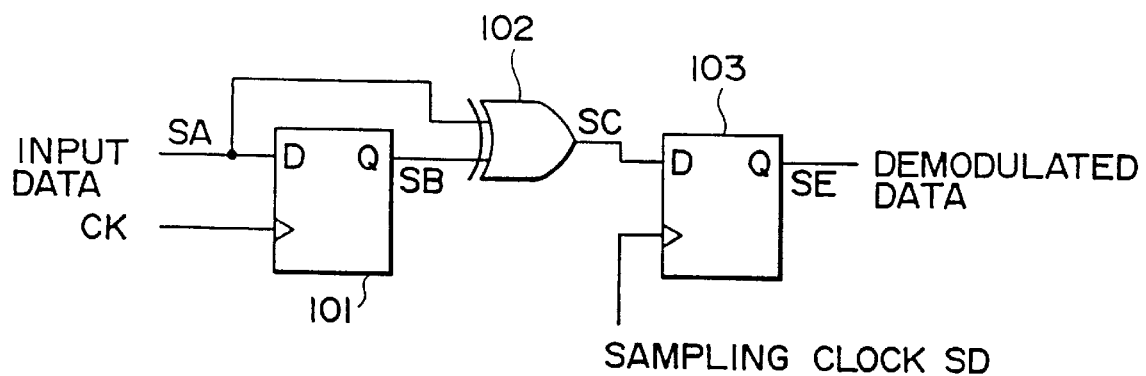

F I G. 15A 
F I G. 15B 
F I G. 15C 
F I G. 15D 

APPARATUS FOR DEMODULATING DIGITAL FM SIGNAL IN AN OPTICAL DISC DEVICE

This application is a division of application Ser. No. 08/665,884, filed Jun. 19, 1996.

BACKGROUND OF THE INVENTION

The present invention relates to demodulation and, more particularly to a digital FM signal demodulator which detects and corrects errors.

Frequency modulation (FM) has been widely used, for example, in an optical disc device or in a magneto-optic disc device FM has been used to record address information in slightly wobbled tracks of the record medium, known as a minidisc. The wobbled tracks allow the recording apparatus to provide position information of the optical head on the disc without the use of any position detector. Apparatus for recording wobbled tracks (spiral groove) on a record medium is described in U.S. Pat. No. 4,942,565, the disclosure of which is incorporated herein by reference.

One advantageous technique used to record FM digital signals is to invert the polarity, or signal level, at the boundary of data bits as shown in FIG. 9A. As also seen from FIGS. 9A and 9B, a "1" is represented by an inversion at the center of the data bit whereas a "1" is represented by no inversion.

FIG. 10 is a circuit diagram illustrating one embodiment of a demodulator that can be used to demodulate digital FM signals. The demodulator is provided with a D-type (delay) flip-flop 101 for receiving the digital FM signal SA and a clock signal CK as inputs, an exclusive OR (XOR) gate 102 for receiving digital FM signal SA and the Q output (SB) of the D-type flip-flop 101 as inputs, and another D-type flip-flop 103 for receiving output SC of the XOR gate 102 and a sampling clock SD as inputs.

Demodulation processing of the demodulator of FIG. 10 is described herein in conjunction with for example, the input data stream "01100", shown in FIG. 11A. When the input data pattern "01100" of digital FM signal SA (FIG. 11B) is supplied to the data input line D of the D-type flip-flop 101, the D-type flip-flop 101 delays the input data SA by one time period of the clock pulse CK and outputs the data SB (FIG. 11C) to the XOR gate 102.

The XOR gate 102 performs an exclusive OR boolean operation on the input data SA and the Q output data SB of the D-type flip-flop 101. The level of the output SC (FIG. 11D) of the XOR gate 102 is "1" when the data bits of SA and SB are different. The exclusive OR operation is defined as $$SC = SA \oplus SB \qquad \text{Eq. (1)}$$

When the output data SC from the XOR gate 102 is supplied to the data input line D of the D-type flip-flop 103, the D-type flip-flop 103 outputs demodulated data SE (FIG. 11F) in synchronism with the leading edge of each positive clock pulse of the sampling clock SD (FIG. 11E), thereby providing the demodulated data stream "01100". The sampling clock SD is synchronized with the clock signal CK, but is delayed by ½ time period of the clock pulse CK.

Although digital FM signals are consistently inverted at the bit cell boundary, the actual point of inversion may shift (fluctuate) during signal transmission due to jitter and disturbances. In such case, the demodulator of FIG. 10 generates erroneous demodulated data because the demodulation is based primarily on the frequency (or pulse width) difference of the data bits "1" and "0".

The erroneous generation of demodulated data using the demodulator of FIG. 10 is described in conjunction with FIGS. 12A–12G, where jitter or other disturbances cause the boundary of the data bits "10" of the input data (FIG. 12A) to be effectively shifted in the direction of the arrow (to the right) in the FM signals SA (FIG. 12B). When the shifted input data stream "01100" of digital FM signal SA is supplied to the data input line D of the D-type flip-flop 101, the D-type flip-flop 101 delays the shifted input data SA by one time period of the clock pulse CK and outputs data SB (FIG. 12C) to the XOR gate 102.

The XOR gate 102 performs an exclusive OR boolean operation on the shifted input data SA and the output data SB of the D-type flip-flop 101.

When the output data SC (FIG. 12D) from the XOR gate 102 is supplied to the data input line D of the D-type flip-flop 103, the D-type flip-flop 103 outputs demodulated data SE (FIG. 12F) in synchronism with the leading edge of each positive clock pulse of the sampling clock SD (FIG. 12E), resulting in erroneous demodulated data pattern "01110" (FIG. 12G) which is different from the input data SA (FIG. 12A). The broken lines in FIGS. 12B–12F represent the correct signal levels.

OBJECTS OF THE INVENTION

Therefore, it is an object of the present invention to provide a demodulator that consistently demodulates digital FM signals correctly even if the signals contain errors.

Another object of this invention is to provide a demodulator as aforesaid, which can be used in an optical disc device or in a magneto-optic disc device to correctly record and reproduce digital FM signals even if they contain errors.

Various other objects, advantages and features of the present invention will become readily apparent from the ensuing detailed description, and the novel features will be particularly pointed out in the appended claims.

SUMMARY OF THE INVENTION

In accordance with an aspect of this invention, in apparatus provided which correctly demodulates digital FM signals that may contain errors, the received digital FM signal is verified at the data bit boundaries for inversion to detect errors therein. If an uninverted data bit boundary is detected, the demodulating apparatus modifies sections of the digital FM signal just preceding and just following the uninverted data bit boundary to generate two modified signals. Using the error detecting code included in the digital FM signal, the apparatus evaluates the two modified signals to determine which modification corrects the errors and selects the modified signal with the correct modification. The digital FM signal then is corrected in accordance with the selected modified signal.

In accordance with another aspect of this invention, the demodulator correctly demodulates the digital FM signal by delaying the digital FM signal and combining the delayed signal with the original signal to form a combination signal. The resulting combination signal is further delayed; and the non-delayed and delayed versions of the combination signal are further combined to produce the demodulated data.

In a preferred application, the invention is incorporated into a recording and reproducing apparatus.

BRIEF DESCRIPTION OF THE DRAWINGS

The following detailed description, given by way of example, and not intended to limit the present invention solely thereto, will best be understood in conjunction with the accompanying drawings in which:

FIG. 5 is a circuit diagram illustrating the primary components of the demodulating apparatus of FIG. 1;

FIGS. 6A–6I are timing diagrams to which reference will be made in describing the demodulation of a digital FM signal in accordance with the present invention;

FIGS. 7A–7I are timing diagrams to which reference will be made in describing the demodulation of one example of an erroneous digital FM signal in accordance with the present invention;

FIGS. 8A–8I are timing diagrams to which reference will be made in describing the demodulation of another example of an erroneous digital FM signal in accordance with the present invention;

FIGS. 9A and 9B are timing diagrams illustrating a typical digital FM signal;

FIG. 10 is a circuit diagram illustrating one embodiment of a known digital FM signal demodulator;

FIGS. 11A–11G are timing diagrams to which reference is made in describing the demodulation of a digital FM signal using the demodulator of FIG. 10;

FIGS. 15A–15D are timing diagrams to which reference will be made in describing one example of a digital FM signal with pre-edge and post-edge modifications in accordance with the present invention.

DETAILED DESCRIPTION OF THE PREFERRED EMBODIMENTS

As previously discussed, the digital FM signals may contain errors when received by the demodulating apparatus. In accordance with this invention, the apparatus detects and corrects errors while demodulating the digital FM signals. An embodiment of the present invention will now be described hereinbelow with reference to the drawings.

Figure 1:
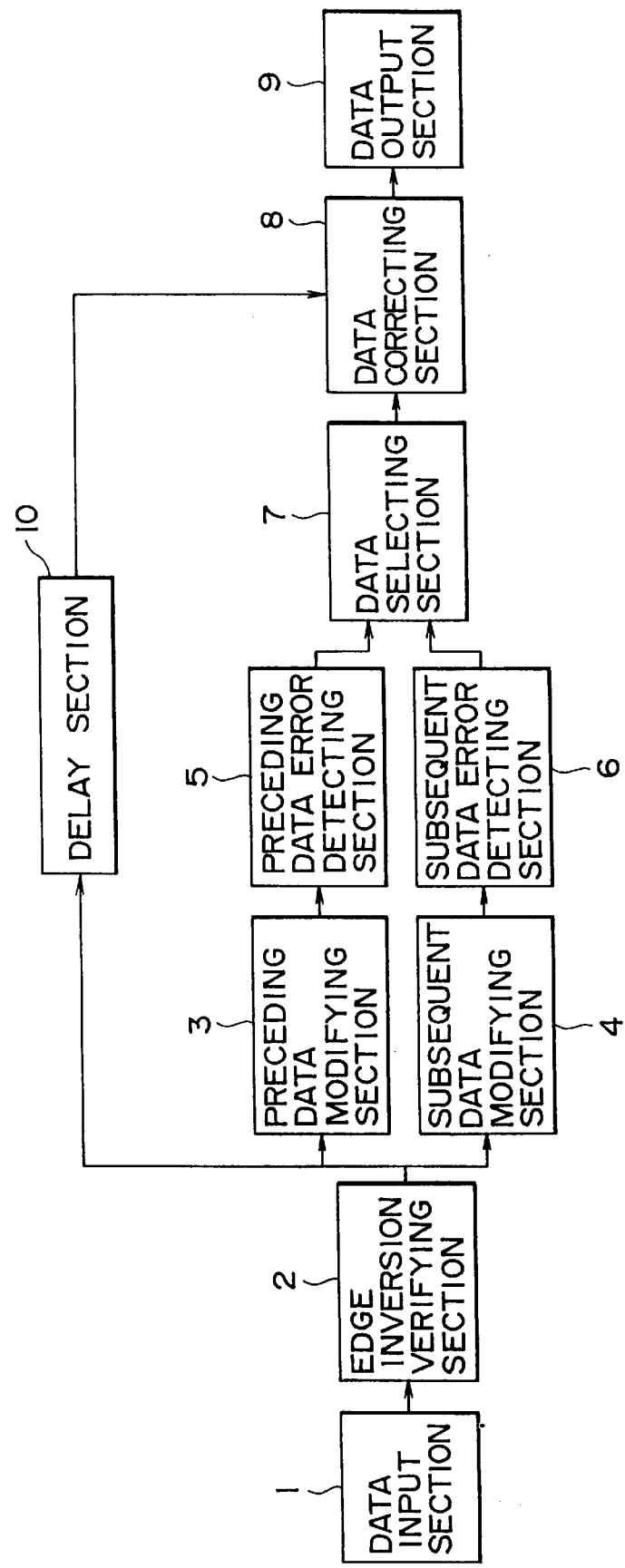
FIG. 1 is a block diagram illustrating one embodiment of an apparatus for demodulating a digital FM signal in accordance with the present invention.

Turning now to FIG. 1, there is illustrated a block diagram of apparatus for demodulating a digital FM signal in accordance with the present invention. The apparatus is comprised of a data input section 1, an edge inversion detecting or verifying section 2 coupled to the data input section 1, preceding and subsequent data modifying sections 3 and 4 coupled to edge inversion verifying section 2 for modifying the input data just before and after an uninverted edge, respectively, and preceding and subsequent data error detecting sections 5 and 6 coupled to the preceding and subsequent data modifying sections 3 and 4, respectively, for judging the correctness of each modified data stream. In addition, the apparatus includes a data selecting section 7 for selecting a correct modified data stream from the preceding data error detecting section 5 or subsequent data error detecting section G, a delay section 10 for delaying the input data to account for the time required to generate and evaluate the modified data streams, a data correcting section 8 for correcting the delayed input data using the modified data stream selected by the data selecting section 7, and a data output section 9 for generating the corrected data.

Figure 2:
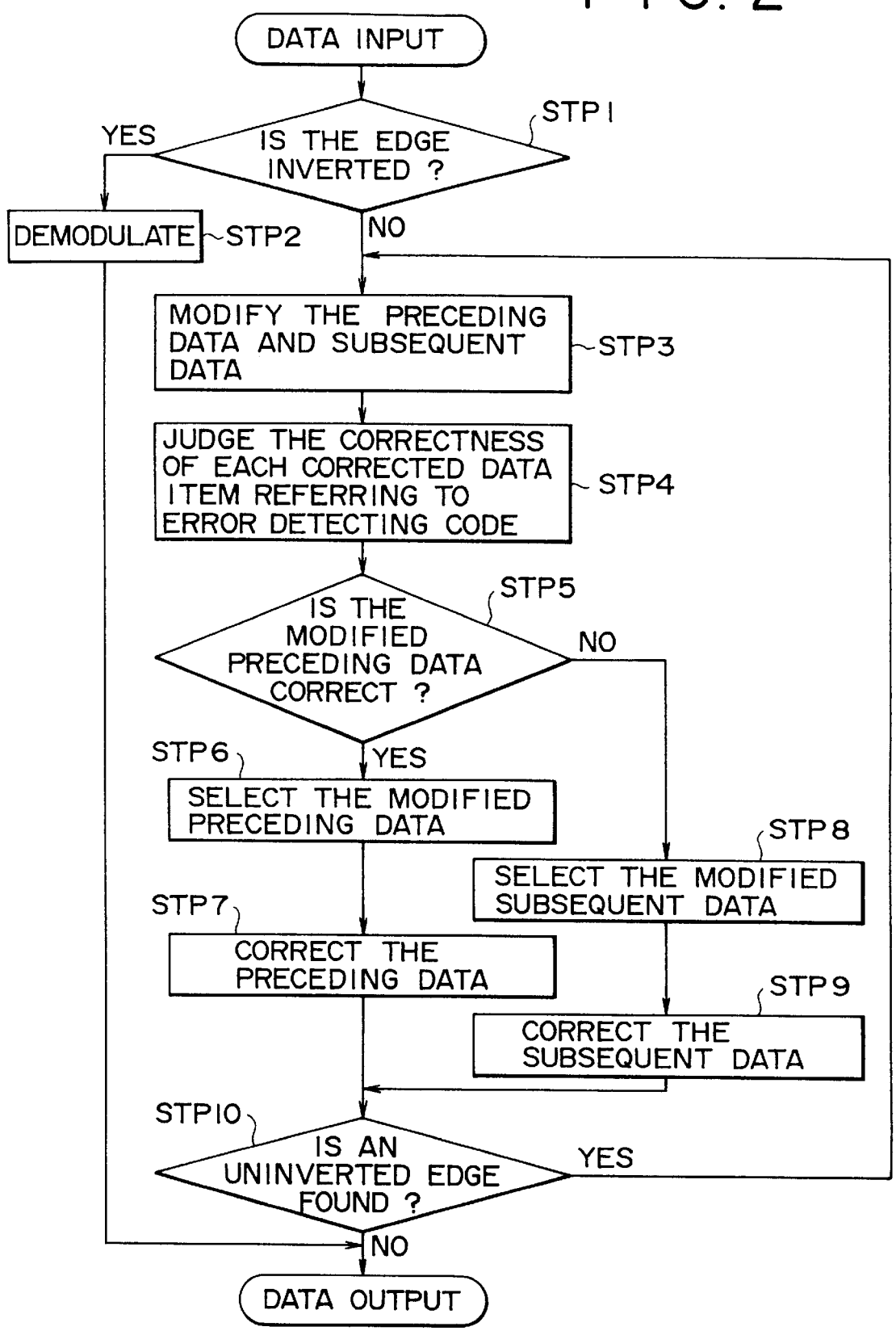
FIG. 2 is a flow chart to which reference will be made in describing the operation of the demodulating apparatus of FIG. 1.

The manner in which the apparatus of FIG. 1 demodulates the digital FM signal will now be explained in conjunction with the flow chart shown in FIG. 2. When a digital FM signal is supplied to the edge inversion verifying section 2 from the data input section 1, inquiry is made at step STP1 to determine whether the signal is inverted or not at the edge of the data bit boundary. If the inquiry at step STP1 is answered in the affirmative, that is, if the signal is inverted at the edge of the data bit boundary, the signal is demodulated normally at step STP2.

However, if the inquiry at step STP1 is answered in the negative, that is, if no inversion is present at the edge of the data bit boundary (as in FIG. 15B), the preceding data modifying section 3 and the subsequent data modifying section 4 respectively independently modify portions of the data stream just before and just after the uninverted edge of the signal to provide modified data streams with pre-edge and post-edge modifications, respectively, at step STP3. The manner in which the data stream is modified is described in greater detail below.

Figure 3:
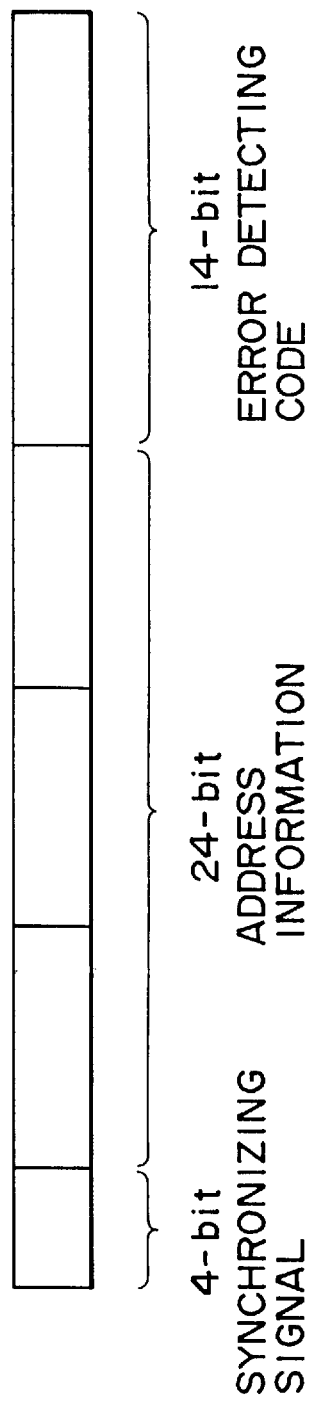
FIG. 3 is a schematic representation of the structure of a data block supplied to the apparatus shown in FIG. 1.

At step STP4, using an error detecting code included in the signal, the preceding and subsequent data error detecting sections 5 and 6 each independently determine if the respective modified data stream contains an error. If no error is detected in the modified data stream with the pre-edge modification, then the polarity (signal value) of the original (unmodified) data stream just before the uninverted edge requires inversion. Conversely, if no error is detected in the modified data stream with the post-edge modification, then the polarity of the original data stream just after the uninverted edge requires inversion. For example, a cyclic redundancy code (CRC) may be used as the error detecting code; and the digital FM signal may comprise a data block having the structure shown in FIG. 3 and including a 4-bit synchronizing signal, 24 bits of address information, and a 14-bit error detecting code. Conventional CRC error detecting techniques may be used to determine the correctness of the modified data streams produced by preceding and subsequent data modifying sections 3 and 4, respectively.

Inquiry at step STP5 then is made to determine if the modified preceding data is correct, and thereby to determine which modification corrects the error detected in the signal. More specifically, if the inquiry at step STP5 is answered in the affirmative, indicating that the modified data stream with the pre-edge modification is correct, the data selecting section 7 selects the modification made by the preceding data modifying section 3 at step STP6. At step STP7, the data correcting section 8 corrects the digital FM signal using the modification technique employed by the data modifying section 3, as selected by the data selecting section 7.

However, if inquiry at step STP5 is answered in the negative, thereby indicating that the data stream with the post-edge modification is correct, the data selecting section 7 selects the modification made by the subsequent data modifying section 4 at step STP8. At step STP9, the data correcting section 8 corrects the digital FM signal using the modification technique employed by data modifying section 4, as selected by the data selecting section 7 at step STP9.

Inquiry at step STP10 is then made to determine if the signal is not inverted at other data bit boundaries. If the inquiry at step STP10 is answered in the affirmative, that is, if there is an additional uninverted data bit boundary in the signal, the operations discussed above in conjunction with steps STP3–STP9 are repeated.

Figure 4:
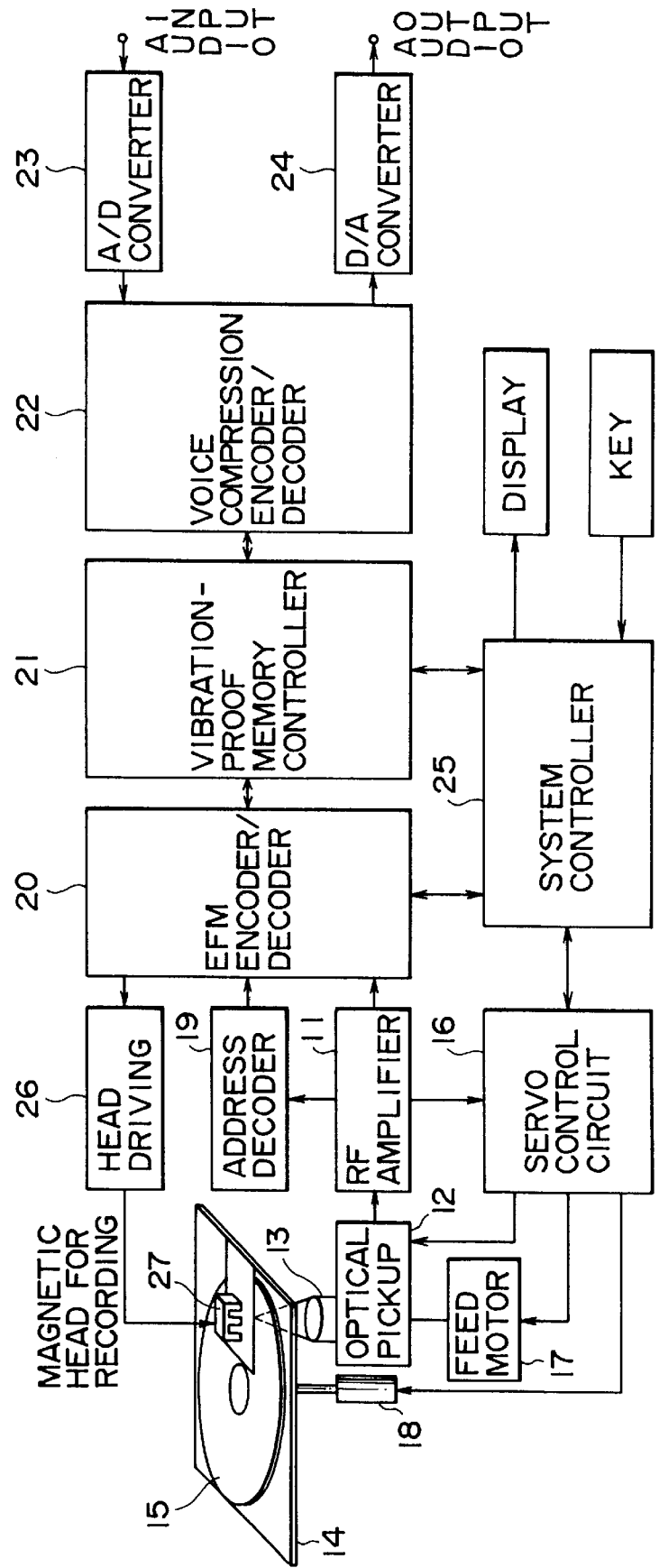
FIG. 4 is a block diagram illustrating an embodiment of the present invention incorporated in a magneto-optic disc device.
Figure 6B:
Figure 6C:
Figure 6D:
Figure 6E:
Figure 6F:
Figure 6G:
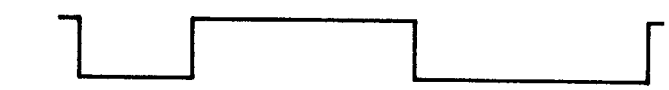
Figure 6H:

In one application, the above-mentioned apparatus for demodulating a digital FM signal is incorporated into a magneto-optic disc device, as explained below in conjunction with FIG. 4.

An input analog audio signal supplied to an A/D converter 23 is there sampled (digitized) into 8-bit words called symbols to form a digital audio signal. The digital audio signal is supplied to a voice compression encoder/decoder 22 which compresses the digital audio signal using standard compression techniques. A vibration proof memory controller 21 prevents loss of audio signals as a result of track skipping which can be caused by excessive vibration (shock) of the magneto-optic disc device.

An EFM or eight to fourteen modulation encoder/decoder 20 encodes a signal received from the vibration proof memory controller 21 using EFM modulation. EFM coding converts a signal of 8 bits per symbol into a 14-bit signal according to a predetermined algorithm, with the purpose of aiding the recording and playback procedure by reducing required bandwidth, reducing the DC content of the signal to be recorded, and adding extra synchronization information. The EFM modulated (14-bit) signal is then supplied to a head driving unit 26 which is shown but not explained because its operation is well known in the art and to a system controller 25. Details of a preferred EFM encoder/decoder (modulation/demodulation circuit) are shown and described in U.S. Pat. No. 4,942,565, the disclosure of which has been already incorporated herein by reference.

In response to the EFM modulated signal, the system controller 25 generates a write signal to record the EFM modulated signal on a magneto-optic disc 15 housed in a cartridge 14 using a magnetic head 27 which is also shown but not explained because its operation is well known in the art.

A frequency modulated (FM) signal produced from the laser beam reflected from the wobbled spiral groove of the disc 15 is received by an optical pickup unit 12. The reproduced FM signal is amplified by a RF amplifier 11 and supplied therefrom to an address decoder 19 and to EFM encoder/decoder 20. Address decoder 19 reads (decodes) absolute address data from the amplified signal. The address data is supplied to system controller 25 via the EFM encoder/decoder 20. The system controller 25 then uses the address data to generate an appropriate position correcting servo signal to control the rotational speed (velocity) and, thus, the linear speed of the disc 15 so that audio signals recorded thereon are reproduced at a constant speed. Also, the position correcting servo signal is used to correct the position of a laser beam irradiated on the magneto-optic disc by way of an objective lens 13 of the optical pickup unit 12.

In response to the position correcting servo signal, a servo control circuit 16 operates a focus servo circuit (not shown), a tracking servo circuit (not shown), a feed motor 17, and a spindle motor 18. The focus servo circuit (not shown) controls the axial movement of optical pickup unit 12 so that a laser beam irradiated on disc 15 focuses precisely on the surface plane of the disc. The tracking servo (not shown) controls the radial movement of the optical pickup unit 12 so that the optical pickup unit can move in a radial direction to precisely trace tracks (wobbled tracks) of the disc 15. The servo control circuit 16 controls the feed motor 17 which moves the optical pickup unit 12 across the disc and the spindle motor 18 which rotates the disc at a constant linear velocity (CLV).

The apparatus for demodulating the digital FM signal in accordance with the present invention is incorporated into the address decoder 19 of the magneto-optic disc drive to insure that correct addresses are decoded by the address decoder. While the present invention has been particularly shown and described with reference to disc drives using magneto-optic discs, it will be readily appreciated that the present invention can be easily incorporated into other disc devices, such as optical disc drives utilizing compact discs.

The RF amplified signal supplied to the EFM encoder/decoder 20 from the RF amplifier 11 is decoded using EFM (Eight to Fourteen Modulation). The EFM encoder/decoder 20 demodulates the RF signal of 14 bits into a parallel 8-bit data output according to a predetermined algorithm. The 8-bit signal output is supplied to vibration proof memory controller 21 to prevent loss of audio signal as result of excessive vibration of the magneto-optic disc device.

The 8-bit signal from the vibration proof memory controller is expanded by encoder/decoder 22 using the inverse of the technique used to compress the signal. The expanded signal is then supplied to a D/A converter 24 which converts the 8-bit digital signal into an analog audio output signal.

Figure 13:
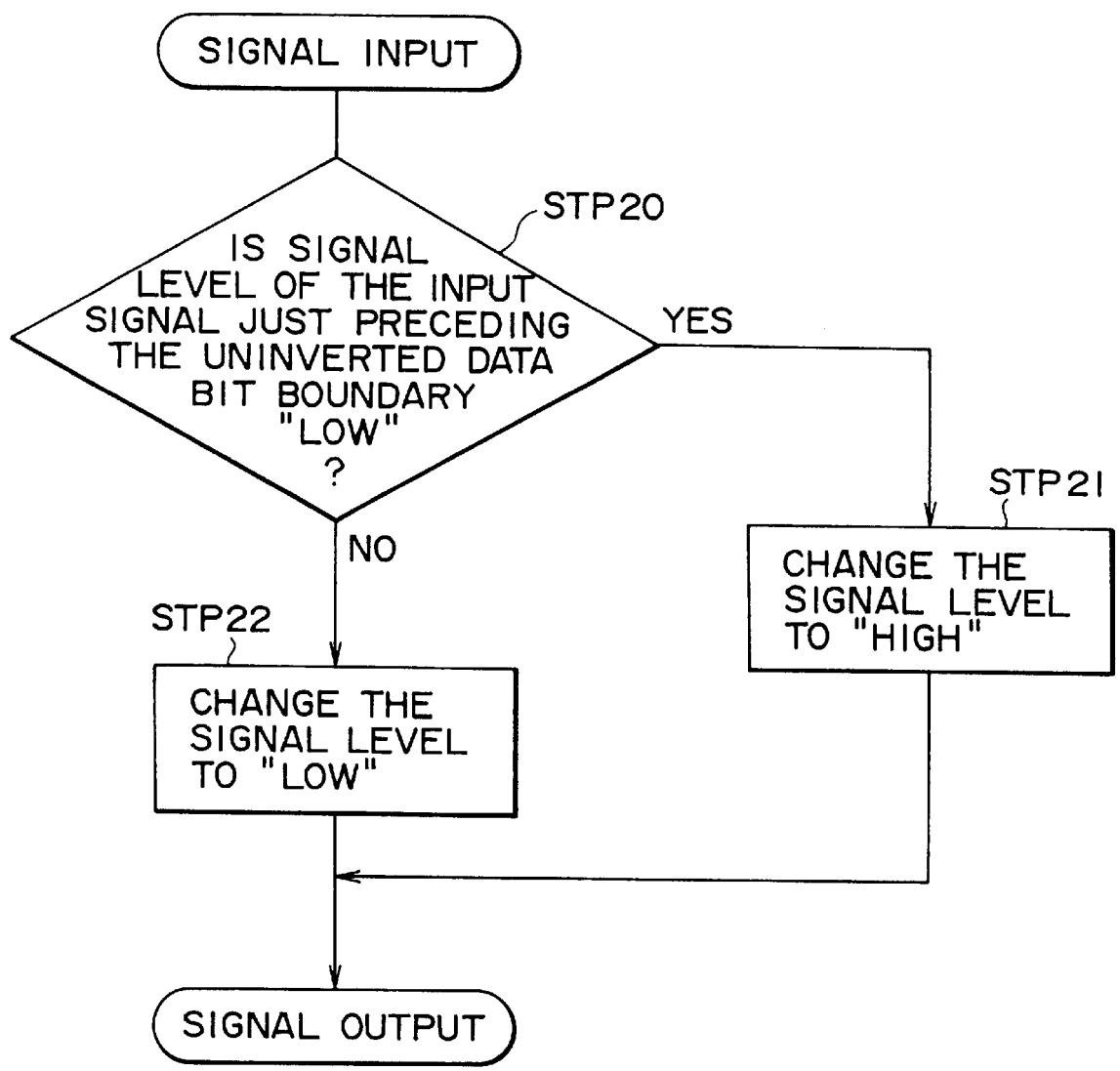
FIG. 13 is a flow chart to which reference is made in describing how a signal is modified with a pre-edge modification.
Figure 14:
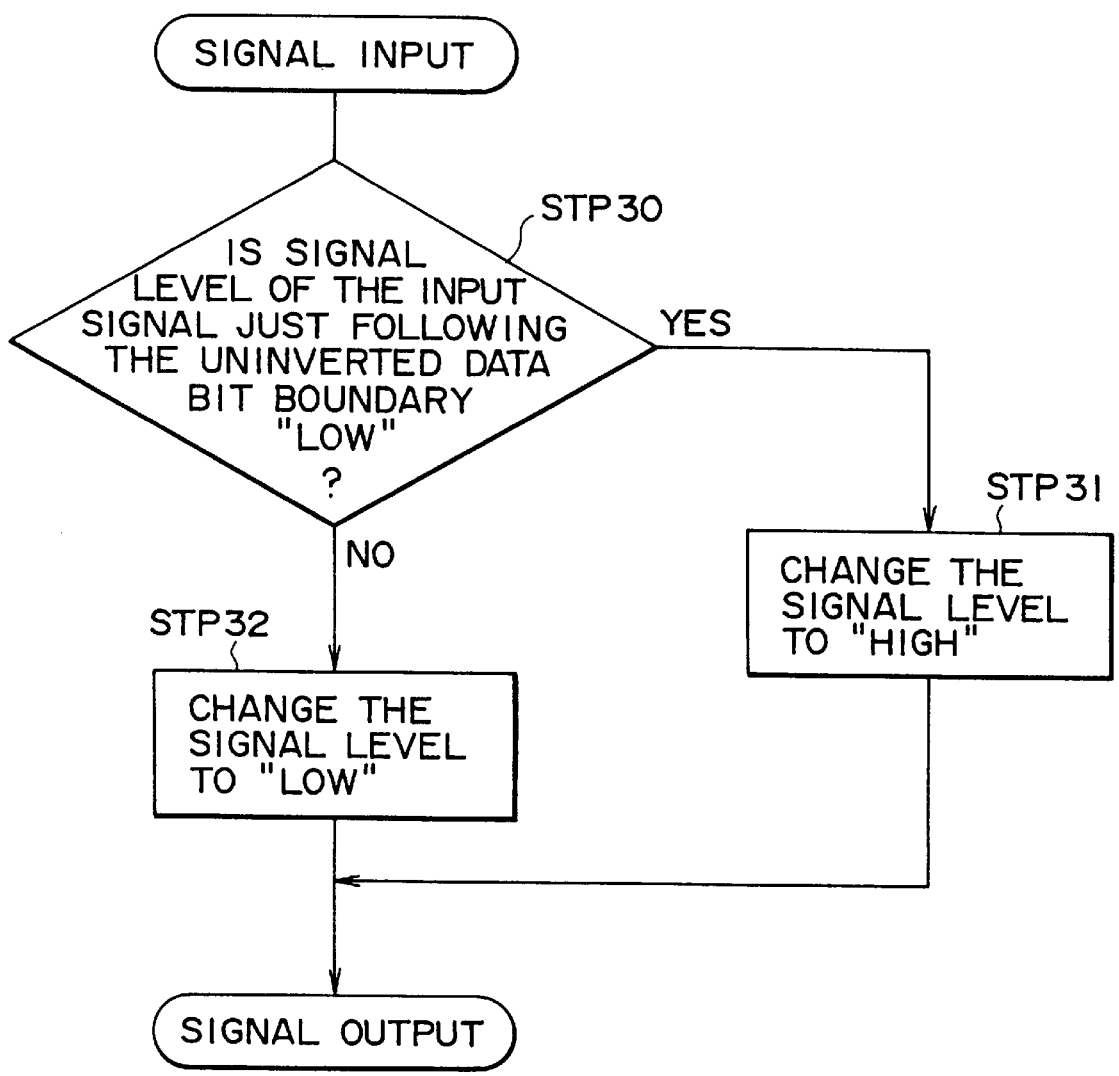
FIG. 14 is a flow chart to which reference will be made in describing how a signal is modified with a post-edge modification.

The manner in which portions of the data stream just before and just after an uninverted edge of the signal are modified by sections 3 and 4, respectively, in FIG. 1 to create an inversion at the uninverted data bit boundary will now be further described in conjunction with the flow charts shown in FIGS. 13 and 14, respectively. When a digital signal with an uninverted data bit boundary is supplied to the preceding modifying section 3, inquiry is made at step STP20 (FIG. 13) to determine whether the polarity, or signal level, of the signal just preceding the uninverted data bit cell boundary is "low". If the inquiry at step STP20 is answered in the affirmative, the polarity of the signal just before the uninverted data bit cell boundary is changed to "high" at step STP21, that is, the polarity of the signal is inverted as in FIG. 15D to generate a signal with the pre-edge modification.

However, if the inquiry at step STP20 is answered in the negative, the polarity of the signal just before the uninverted data bit cell boundary is changed to "low" at step STP22.

When a digital signal with an uninverted data bit boundary is supplied to subsequent modifying section 4, inquiry is made at step STP30 (FIG. 14) to determine whether the polarity, or signal level of the signal just following the uninverted data bit cell boundary is "low". If the inquiry at step STP30 is answered in the affirmative, the polarity of the signal just after the uninverted data bit cell boundary is changed to "high" at STP31, that is, the polarity of the signal is inverted as in FIG. 15C to generate a signal with the post-edge modification.

However, if the inquiry at step STP30 is answered in the negative, the polarity of the signal just after the uninverted data bit cell boundary is changed to "low" at step STP32.

An embodiment of the subsequent data modifying section 4 of the demodulating apparatus of FIG. 1 is shown in FIG. 5 to be provided with a D-type flip-flop 41 for receiving the digital FM signal SA and a clock signal CK as inputs, an exclusive OR gate 42 for receiving the digital FM signal SA and the Q output SB from the D-type flip-flop 41 as inputs, a D-type flip-flop 43 for receiving the output SC from the exclusive OR (XOR) gate 42 and the clock signal CK as inputs, an exclusive NOR (XNOR) gate 44 for receiving the output SC from the XOR gate 42 and the Q output SF from the D-type flip-flop 43 as inputs, and a D-type flip-flop 45 for receiving the output SG from the XNOR gate 44 and a sampling clock SD as inputs.

The process of demodulating the digital FM signal by the circuit shown in FIG. 5 is described below with reference to FIGS. 6A–6I. As was described in connection with FIGS. 11A–11G, when the input data stream "01100" (FIG. 6A) of the digital FM signal SA (FIG. 6B) is supplied to the data input line D of the D-type flip-flop 41, the D-type flip-flop 41 delays the input data SA by one time period of the clock pulse CK and outputs the data SB (FIG. 6C) to the XOR gate 42.

The XOR gate 42 performs an exclusive OR boolean operation on the input data SA and the Q output data SB of the D-type flip-flop 41. The output SC (FIG. 6D) of the XOR gate 42 is "1" when the data bits of SA and SB are different.

When the output data SC from the XOR gate 42 is supplied to the data input line D of the D-type flip-flop 43, the D-type flip-flop 43 delays the data SC by one time period of the clock pulse CK and outputs data SF (FIG. 6E) to the XNOR gate 44.

The XNOR gate 44 performs an exclusive NOR boolean operation on the output data SC of the XOR gate 42 and the Q output data SF of the D-type flip-flop 43. The output SG (FIG. 6F) of the XNOR gate 44 is "1" when the data bits of SA and SB are the same. The exclusive NOR operation is defined as $$SG = SC \odot SF \qquad \text{Eq. (2)}$$

When the output data SG from the XNOR gate 44 is supplied to the data input line D of the D-type flip-flop 45, the D-type flip-flop 45 outputs demodulated data SH (FIG. 6H) in synchronism with the leading edge of each positive clock pulse of the sampling clock SD (FIG. 6G), thereby recovering demodulated data stream "01100" (FIG. 6I) which corresponds to input data SA (FIG. 6A).

The manner in which the demodulating apparatus embodying the present invention correctly demodulates an erroneous digital FM signal will now be described with reference to FIGS. 7A–7I, where the data bit boundary "10" is shifted in the direction of the arrow on FIG. 7B. The shifted input data shown in FIG. 7B is identical to the shifted input data previously mentioned with reference to FIG. 12.

When the shifted input data stream "01100", of the digital FM signal SA (FIG. 7B) is supplied to the data input line D of the D-type flip-flop 41, the D-type flip-flop 41 delays the shifted input data SA by one time period of the clock pulse CK and outputs data SB (FIG. 7C) to the XOR gate 42.

The XOR gate 42 performs an exclusive OR boolean operation on the shifted input data SA and the Q output data SB of the D-type flip-flop 41 to produce output SC (FIG. 7D).

When the output data SC from the XOR gate 42 is supplied to the data input line D of the D-type flip-flop 43, the D-type flip-flop 43 delays the data SC by one time period of the clock pulse CK and outputs data SF (FIG. 7E) to the XNOR gate 44.

The XNOR gate 44 performs an exclusive NOR boolean operation on the output data SC of the XOR gate 42 and the Q output data SF of the D-type flip-flop 43 to produce output SG (FIG. 7F).

When the output data SG from the XNOR gate 44 is supplied to the data input line D of the D-type flip-flop 45, the D-type flip-flop 45 outputs demodulated data SH (FIG. 7H) on the leading edge of each positive clock pulse of the sampling clock SD (FIG. 7G). Unlike the known demodulator of FIG. 10, correctly demodulated data stream "01100" (FIG. 7I) which corresponds to the input data SA (FIG. 7A) is obtained. The broken lines in FIGS. 7B–7F represent the correct signal levels.

Figure 8B:

The demodulating apparatus embodying the present invention similarly provides the correctly demodulated data stream "01100" when it receives a digital FM signal SA which, because of the fluctuations, omits the data bit boundary "11" (FIG. 8B).

Figure 8C:

When the erroneous digital FM signal SA shown in FIG. 8B is supplied to the data input line D of D-type flip-flop 41, the D-type flip-flop 41 delays the input data SA by one time period of the clock pulse CK and outputs data SB (FIG. 8C) to the XOR gate 42.

Figure 8D:
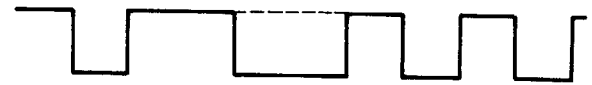

The XOR gate 42 performs an exclusive OR boolean operation on the input data SA and the Q output data SB of the D-type flip-flop 41 to produce output SC (FIG. 8D).

Figure 8E:

When the output data SC from the XOR gate 42 is supplied to the data input line D of the D-type flip-flop 43, the D-type flip-flop 43 delays the data SC by one time period of the clock pulse CK and outputs data SF (FIG. 8E) to the XNOR gate 44.

Figure 8F:

The XNOR gate 44 performs an exclusive NOR boolean operation on the output data SC of the XOR gate 42 and the Q output data SF of the D-type flip-flop 43 to produce output SG (FIG. 8F).

Figure 8G:
Figure 8H:
Figure 12A:
FIGS. 12A–12G are timing diagrams to which reference is made in describing the demodulation of an erroneous digital FM signal using the demodulator of FIG. 10.
Figure 12B:
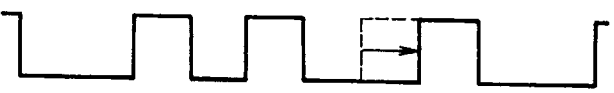
Figure 12C:
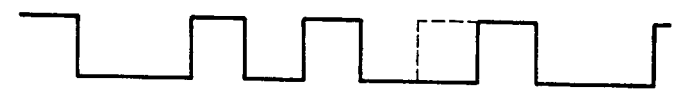
Figure 12D:
Figure 12E:
Figure 12F:
Figure 12G:
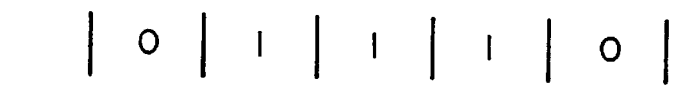

When the output data SG from the XNOR gate 44 is supplied to the data input line D of the D-type flip-flop 45, the D-type flip-flop 45 outputs demodulated data SH (FIG. 8H) on the leading edge of each positive clock pulse of the sampling clock SD (FIG. 8G). Therefore, correctly demodulated data stream "01100" (FIG. 8I) which corresponds to the input data SA (FIG. 8A) is obtained. Once again, the broken lines in FIGS. 8B–8F represent the correct signal levels.

As described hereinbefore, according to the present invention, correct demodulated data is obtained consistently even if the input digital FM signal to be demodulated contains errors.

While the present invention has been particularly shown and described with reference to a preferred embodiment, it will be readily appreciated that various changes may be made without departing from the spirit and scope of the invention. For example, the demodulating apparatus may be incorporated into other disc devices, such as an optical disc device utilizing compact discs.

It is intended that the appended claims be interpreted to include the embodiments discussed above, those various alternatives which have been described and all equivalents thereto.

What is claimed:

1. Apparatus for recording or reproducing data on a disc-shaped recording medium having a wobbled spiral groove thereon, comprising:

means for emitting a laser beam to impinge on said recording medium;

means for receiving said laser beam reflected from said recording medium;

means for detecting a frequency modulated signal produced by the reflection of said laser beam from said spiral groove and which is expected to have level inversions at data bit boundaries of said frequency modulated (FM) signal;

means for demodulating said FM signal, said means for demodulating includes means for correcting a signal level of said FM signal just after said means for detecting senses the absence of a level inversion at a respective one of said data bit boundaries;

a recording or reproducing head moveable in respect to said recording medium;

means for determining a position of said recording or reproducing head on said recording medium in response to said demodulated FM signal; and means for recording data on or reproducing data from said determined position on the recording medium by means of said head.

2. The apparatus of claim 1, wherein said means for correcting comprises:

means for delaying said digital FM signal by one clock pulse of a first clock signal to provide a first delayed signal;

means for combining said digital FM signal and said first delayed signal to provide a first combined signal;

means for delaying said first combined signal by one clock pulse of said first clock signal to provide a second delayed signal;

means for combining said first combined signal and said second delayed signal to provide a second combined signal; and means for generating a demodulated signal from said second combined signal in synchronism with a second clock signal.

3. The apparatus of claim 2, wherein said means for combining said digital FM signal and said first delayed signal is an exclusive OR circuit; and wherein said means for combining said first combined signal and said second delayed signal is an exclusive NOR circuit.

4. The apparatus of claim 2, wherein said means for delaying said digital FM signal and said first combined signal and said means for generating a demodulated signal are D-type flip-flops.

5. The apparatus of claim 2, further comprising first generating means for generating said first clock signal, and second generating means for generating said second clock signal, and wherein said second clock signal is different from said first clock signal.

6. The apparatus of claim 1, wherein data stored in said spiral groove of said recording medium is address information; and wherein said means for demodulating demodulates said address information.

7. The apparatus of claim 1, wherein said disc-shaped recording medium is an optical disc.

8. Apparatus for recording or reproducing data on a disc-shaped recording medium having a wobbled spiral groove thereon, comprising:

means for emitting a laser beam to impinge on said recording medium;

means for receiving said laser beam reflected from said recording medium;

means for detecting a FM signal produced by the reflection of said laser beam from said spiral groove and which contains error correcting code and is expected to have level inversions at data bit boundaries of said FM signal;

means for demodulating said FM signal, said means for demodulating includes means for modifying a signal level of said FM signal just before and just after said means for detecting senses the absence of a level inversion at a respective one of said data bit boundaries to provide first and second modified FM signals, respectively;

means for evaluating said first and second modified FM signals using said error detecting code included in said FM signal so as to determine which of said first and second modified FM signals corrects said uninverted data bit boundary in said FM signal;

means for selecting said modified FM signal which corrects said uninverted data bit boundary;

means for correcting said FM signal in accordance with said modified FM signal selected by said selecting means to provide a corrected FM signal;

a recording or reproducing head movable in respect to said recording medium;

means for determining a position of said recording or reproducing head on said recording medium in response to said corrected FM signal; and means for recording data on or reproducing data from said determined position on the recording medium by means of said head.

9. The apparatus of claim 8, wherein said means for modifying comprises means for detecting the existence or nonexistence of signal level inversions of said FM signal at respective data bit boundaries so as to indicate errors in said FM signal in response to said nonexistence of signal level inversions.

10. The apparatus of claim 8, wherein said means for modifying comprises:

means for delaying said digital FM signal by one clock pulse of a first clock signal to provide a first delayed signal;

means for combining said digital FM signal and said first delayed signal to provide a first combined signal;

means for delaying said first combined signal by one clock pulse of said first clock signal to provide a second delayed signal;

means for combining said first combined signal and said second delayed signal to provide a second combined signal; and means for generating a demodulated signal from said second combined signal in synchronism with a second clock signal.

11. The apparatus of claim 10, wherein said means for combining said digital FM signal and said first delayed signal is an exclusive OR circuit; and wherein said means for combining said first combined signal and said second delayed signal is an exclusive NOR circuit.

12. The apparatus of claim 10, wherein said means for delaying said digital FM signal and said first combined signal and said means for generating a demodulated signal are D-type flip-flops.

13. The apparatus of claim 10, wherein said means for modifying further include first generating means for generating said first clock signal and second generating means for generating second clock signal, and wherein said second clock signal is different from said first clock signal.

14. The apparatus of claim 8, wherein data stored in said spiral groove of said recording medium is address information; and wherein said means for demodulating demodulates said address information.

15. The apparatus of claim 8, wherein said disc-shaped recording medium is an optical disc.

16. A method of recording or reproducing data on a disc-shaped recording medium having a wobble spiral groove thereon, comprising the steps of emitting a laser beam to impinge on said recording medium;

receiving said laser beam reflected from said recording medium;

detecting a FM signal produced by the reflection of said laser beam from said spiral groove and which contains error correcting code and is expected to have level inversions at data bit boundaries of said FM signal;

demodulating said detected FM signal by modifying a signal level of said FM signal just before and just after a data bit boundary at which a signal level inversion is nonexistent so as to provide first and second modified FM signals, respectively, evaluating said first and second modified FM signals using said error detecting code included in said detected FM signal so as to determine which of said first and second modified FM signals corrects said uninverted data bit boundary in said detected FM signal, selecting said modified digital FM signal which corrects said uninverted data bit boundary, and correcting said detected FM signal in accordance with the selected modified digital FM signal to provide a corrected FM signal;

determining a position of a recording or reproducing head on said recording medium in response to said corrected FM signal; and recording data on or reproducing data from said determined position on the recording medium.

17. The method of claim 16, wherein the step of demodulating further includes detecting the existence or nonexistence of signal level inversions of said FM signal at respective data bit boundaries so as to indicate errors in said FM signal in response to said nonexistence of signal level inversions.

18. The method of claim 16, wherein the step of demodulating includes delaying said digital FM signal by one clock pulse of a first clock signal to provide a first delayed signal;

combining said digital FM signal and said first delayed signal to provide a first combined signal;

delaying said first combined signal by one clock pulse of said first clock signal to provide a second delayed signal;

combining said first combined signal and said second delayed signal to provide a second combined signal; and generating a demodulated signal from said second combined signal in synchronism with a second clock signal.

* * * * *